United States Patent [19]

Poong et al.

[11] Patent Number: 4,900,411
[45] Date of Patent: Feb. 13, 1990

[54] METHOD OF PREPARING A HIGH-PURITY POLYCRYSTALLINE SILICON USING A MICROWAVE HEATING SYSTEM IN A FLUIDIZED BED REACTOR

[75] Inventors: Yoon Poong, Seoul; Song Yongmok, Chungnam, both of Rep. of Korea

[73] Assignee: Korea Research Institute of Chemical Technology, Chungnam, Rep. of Korea

[21] Appl. No.: 925,775

[22] Filed: Oct. 30, 1986

[30] Foreign Application Priority Data

Dec. 28, 1985 [KR] Rep. of Korea ............... 9938/1985

[51] Int. Cl.$^4$ .................. C01B 33/02; B05D 7/00
[52] U.S. Cl. .................. 204/157.43; 204/157.45; 423/348; 423/349; 427/213
[58] Field of Search .............. 423/349, 348, 350; 204/157.43, 157.45; 427/86, 213; 118/716

[56] References Cited

U.S. PATENT DOCUMENTS

| 4,292,344 | 9/1981 | McHale ............... 118/716 |
| 4,416,913 | 11/1983 | Ingle et al. ............ 423/350 |
| 4,435,374 | 3/1984 | Helm ................ 204/157.43 |

OTHER PUBLICATIONS

D. J. DeLong: "Advances in Dichlorosilane Epitaxial Technology", Solid State Tech., Oct. 1972.
J. F. Franz: "Design for Fluidization" Chemical Engineering, Oct. 1, pp. 89–96 (1962).
Chemical Engineers Handbook, 5th edition, 1973, Perry et al., pp. 20–64.

Primary Examiner—John Doll
Assistant Examiner—Lori F. Cuomo
Attorney, Agent, or Firm—Jordan and Hamburg

[57] ABSTRACT

Method and apparatus for the preparation of high-purity polycrystalline silicon deposited by thermal decomposition or hydrogen reduction of a gaseous halogenated silicon on high-purity silicon particles in a fluidized bed reactor heated by microwave.

14 Claims, 3 Drawing Sheets

4,900,411

METHOD OF PREPARING A HIGH-PURITY POLYCRYSTALLINE SILICON USING A MICROWAVE HEATING SYSTEM IN A FLUIDIZED BED REACTOR

BACKGROUND OF THE INVENTION

1. Field of the Invention

The invention relates to a process for the preparation of polycrystalline silicon and its apparatus. Particularly, the invention relates to a process for the preparation of high-purity polycrystalline silicon deposited by thermal decomposition or hydrogen reduction of a gaseous halogenated silicon compound such as silane($SiH_4$), dichlorosilane($SiH_2Cl_2$), trichlorosilane($SiHCl_3$) and tribromosilane($SiHBr_3$) on high-purity silicon particles in a fluidized bed reactor heated by microwave and its apparatus.

2. Description of the Prior Art

Typical processes and apparatuses are disclosed in Siemens process where silicon is deposited by hydrogen reduction of trichlorosilane or dichlorosilane on silicon bar heated by electrical resistance method as described in U.S. Pat. No. 3,286,685, and Komatsu process where silicon is deposited by thermal decomposition of silane as described in U.S. Pat. Nos. 4,148,814 and 4,150,168.

In the former, silicon bar is heated to about 1000° to 1200° C. by resistance heating, while in the latter, it is heated to thermal decomposition temperature of about 800° C. The reactors of both processes have the same type of quartz, or stainless steel bell jar which has an advantage that the reactor wall is cooled below 300° C. by a coolant such as water or air so that silicon is not deposited on the inner wall, but have a disadvantage in that the polysilicon deposition rate is low, while the unit energy consumption is high because of the batch process using silicon bar which provides small surface areas for deposition.

To reduce the effects of these disadvantages, a fluidized bed process has been proposed, where silicon in the silicon-containing gas is deposited onto silicon particles while silicon particles having a large depositing area are fluidized by silicon-containing gas and carrier gas.

The fluidized bed process as mentioned above, however, generally employs an external heating method, e.g., a resistance heater as described in U.S. Pat. Nos. 3,102,861, 3,102,862, 4,207,360 and 3,963,838; Japanese Patent Laid-Open Application (KOKAI) Nos. 59-45916, 59-45917 and 57-135708, where the temperature of the reactor is higher than that of the materials to be heated, which brings about wall deposition. This heating method normally brings about a large amount of heat loss to the environment from the system, and also, it makes it very difficult to build a large diameter reactor due to limitation of the heat supply needed for CVD(chemical vapor deposition). Particularly, thermal decomposition of silane or dichlorosilane causes silicon deposition onto the inner wall of the reactor, whereby not only is reactor inner volume reduced but also heat conduction becomes worse, so that it is difficult or impossible to carry out further operations. Moreover, in the case of a quartz reactor, it may be cracked, when the reactor is cooled, due to different thermal expansion between the quartz reactor and deposited silicon (U.S. Pat. No. 3,963,838).

Internal installation of a heater instead of external heating in the system was proposed as a means of reducing the effect of the disadvantages as mentioned above. However, in the process using internal installation, silicon is deposited on the heater surface, which makes it impossible to use the process for a long time, and there still remain inherent problems related to maintenance and exchange of the heater in the case of a immersion of polysilicon resistance heater in the reactor. Particularly, internal installation of a heater is limited, since the heater itself causes some problems in making good fluidization and in eliminating contamination due to direct contact with silicon particles, and also it occupies some volume of the reactor, which reduces efficiency of the reactor and the effect of heating.

SUMMARY OF THE INVENTION

The inventors engaged in research in order to solve the above problems/disadvantages and concluded that a microwave direct heating process is the most effective heating method. A microwave heater has the advantage of keeping the temperature of the wall lower than that of the materials to be heated, because heat is not generated within the quartz due to transmission of microwaves through the wall. On the other hand, heat is generated within the materials to be heated by molecular friction due to polarized vibration within an electromagnetic field formed by the microwaves. Moreover, it is possible to prevent depositing silicon onto the inner wall by virtue of cooling the reactor wall to the desired temperature by coolant injection outside the reactor wall. Microwave is utilized to heat silicon particles within a fluidized bed reactor which provides a large heating surface. Therefore, according to the present invention, long-period operation is possible and a large quantity of high-purity polycrystalline silicon can be continuously prepared.

BRIEF DESCRIPTION OF THE DRAWINGS

The invention is hereinafter further described with reference to the accompanying drawings in which.

DETAILED DESCRIPTION OF THE PREFERRED EMBODIMENTS

Figure 1:
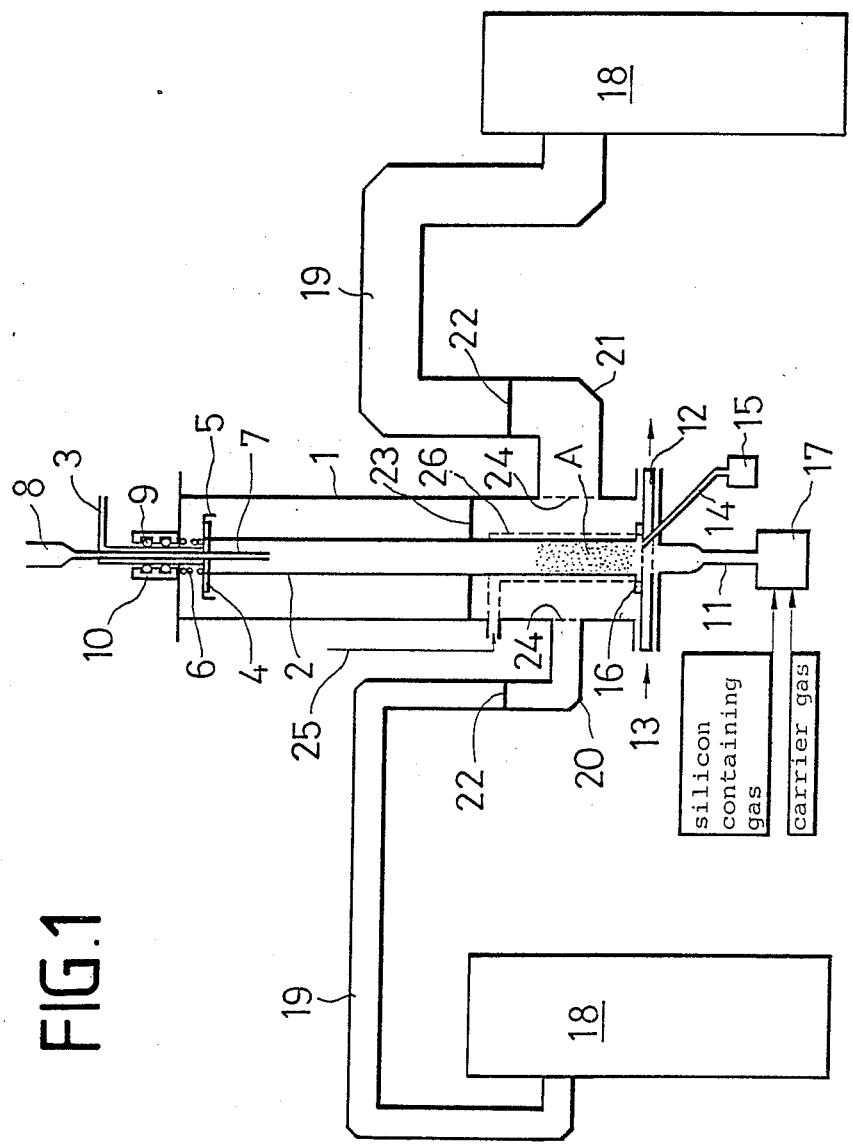
FIG. 1 illustrates an embodiment of an apparatus according to the invention.

FIG. 1 illustrates the embodiment of an apparatus for the preparation of high-purity polycrystalline silicon by the new mode heating method for a fluidized bed reactor according to the present invention. 1 is a heating applicator made of metal such as stainless steel that resists high temperature and reflects microwaves without loss. 2 is a single column cylindrical quartz reactor located at the center of applicator 1. The top of quartz reactor 2 joins with gas outlet 3 at the upper portion of applicator 1. Gas outlet 3 projects out and is installed in non-fixed form, and graphite gasket 4 is inserted between the joints with quartz reactor 2. Graphite gasket 4 is kept on in situ position by holder 5 located at the side of gas outlet 3, while holder 5 is subject to resilient force in axial direction by spring 6. Therefore, the joined portion is kept tight by spring pressure to quartz reactor 2 through holder 5 even when the reactor moves in small range. Seed injection tube 7 pierces within gas outlet tube 7. The lower of the two ends of seed injection tube 7 is extended to an inner part of quartz reactor 2 and the other of the two ends is projected outwardly to hopper 8. Top portion of applicator 1 through which gas outlet tube 3 passes is sealed by Teflon seal 9 and gas cut-off holder 10 to keep gas-tight.

Gas inlet tube 11 is connected to the lower portion of applicator 1, and gas distribution plate 12 is inserted between the gas inlet tube 11 and the lower portion of quartz reactor 2. Coolant path 13 is contained in gas distribution plate 12. Particle outlet tube 14 is connector into a lower portion of quartz reactor 2 and extends to a silicon collecting vessel 15. Graphite gasket 16 is installed to prevent leakage of reacting gas from quartz reactor 2 to applicator 1.

Evaporator/preheater 17 is installed near gas inlet 11. Microwave generators 18 are installed at both sides of applicator 1. E-cornered microwave guide tube 20 and H-cornered microwave guide tube 21 from microwave generators 18 are symmetrically connected to lower side portions of applicator 1. Microwave guide tubes 19, 20 and 21 are preferably made of aluminum rectangular tubes which gives negligible loss of power in microwaves transfer. They guide oscillated microwave from a magnetron (not shown in the Figure) of microwave generators 18 to applicator 1.

On the way of E-cornered microwave guide tube 20 and H-cornered microwave guide tube 21, there are more than one gas cut-off membrane. The gas cut-off membrane 22 serves to prevent coolant for quartz reactor wall 2 in applicator 1 from flowing into microwave generator 18, and preferably employs a plate such as quartz, pyrex or Teflon, which has good microwave transfer characteristics. Moreover, microwave shield 23 is installed at an inner middle portion of applicator 1. Microwave shield 23 is made of a metal reflecting microwaves, whereby the microwave penetration volume is limited within the material to be heated, which thereby makes the microwave penetrating density high enough to carry out good microwave heating of the material.

In the above apparatus of the present invention, silicon seed is introduced into quartz reactor 2 through seed injection tube 7 from hopper 8.

Microwave generator 8 produces microwaves which penetrate into quartz reactor 2 within applicator 1 and into silicon particles forming fluidized bed of silicon seed particles A. By the electromagnetic field formed, polarized vibrating friction takes places in the seed silicon to be heated by itself to reaction temperature from 600° to 1200° C. Usually microwave of 915 or 2450 MHz is used.

Silicon-containing gas as a reactant is injected through gas injection tube 11 with carrier gas such as hydrogen after being preheated to about 300° C. in evaporator/preheater 17. Injected reactant gas disperses in quartz reactor 2 by gas distribution plate 12 to mix and fluidize bed A. Thus, fluidizing gas undertakes thermal decomposition or hydrogen reduction by contacting hot silicon seed and deposits on the seed surface by chemical vapor deposition. Seed particles thus become larger. Adequately large particles pass through particle outlet tube 14 and are collected in polysilicon collecting vessel 15.

In the aforementioned process, silicon particles are produced continuously because silicon seed and reacting gas are supplied continuously. Moreover, by-product gas or non-reacted gas in the above reaction can be recovered and used again by gas outlet tube 3 and recovery apparatus (not shown in the Figures).

As the reaction proceeds, gas distribution plate 12 is heated by heat transfer from hot silicon particles, and silicon particles in fluidized bed A are not normally fluidized after a long period of reaction, because silicon is deposited on the surface of distribution plate 12 by reacting gas passing through the plate.

These problems can be removed by cooling gas dispersion plate 12 below 400° C. with circulating coolant such as water or nitrogen as shown in FIG. 1. The same problems as above can take place in the quartz reactor wall. Thus deposited silicon on the inner wall forces the inner volume to be reduced. Therefore, the temperature of the inner wall of quartz reactor 2 and in the gas dispersion plated 12 should be cooled to a temperature to prevent substantial deposition of silicon on said gas dispersion plate 12 and on the reactor wall, that is, to a temperature below the reaction temperature of silicon-containing gas by circulating coolant in the gas dispersion plate and in cooling path 25 formed between the inner wall of applicator 1 and the outer wall of quartz reactor 2 to prevent these problems. Moreover, quartz reactor 2 can contain separate cooling path 26 between double tubes.

When silicon seed is heated by microwave in the quartz reactor 2, the reactor is expanded thermally by heat transfer. But applicator 1 is not thermally expanded, and therefore quartz reactor 2 may crack. According to the present invention, the spring 6 supporting the holder 5 of gas outlet tube 3 is pressed, and prevents any damage incurred by thermal expansion when the quartz reactor 2 expands.

Figure 2:
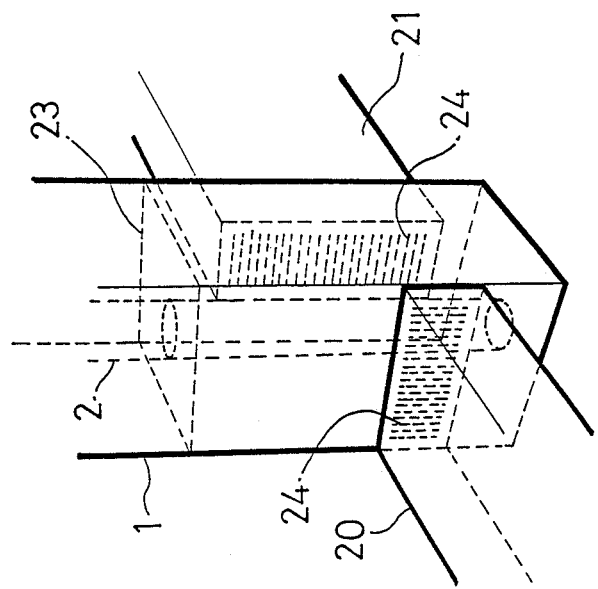
FIG. 2 illustrates important parts of FIG. 1.

FIG. 2 illustrates a construction related to E-cornered microwave guide tube 20 and H-cornered microwave guide tube 21. Both E-cornered and H-cornered microwave guide tubes 20 and 21 have a rectangular shape and face each other in different modes, 25 shown in FIG. 2. Microwave modes 24 introduced from the microwave generators to applicator 1 cross each other in the opposite direction so that the microwaves coming from two opposite directions do not interfere. Moreover, E-cornered and H-cornered microwave guide tubes are installed to face each other so that the size of the microwave generators can be reduced and energy consumption can also be decreased.

In the aforementioned embodiment of the present system, it is necessary to install at least one pair of microwave generators to form uniform heating. If microwave is introduced from the upper side of applicator 1, one microwave generator may suffice.

Figure 3:
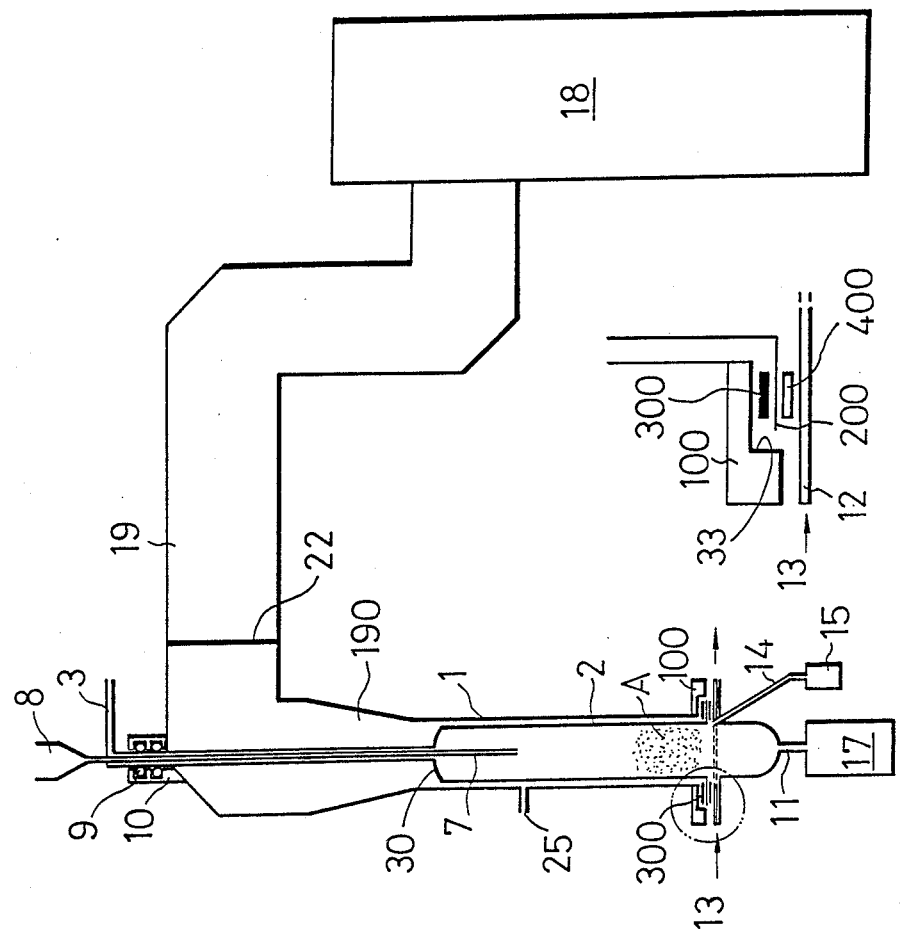
FIG. 3 illustrates another embodiment of an apparatus according to the invention.

FIG. 3 illustrates another embodiment of the above apparatus which can transmit microwaves from the upper side of applicator 1. The same numerals as used in FIG. 1 are applied to the identical parts in this embodiment as those of the aforementioned embodiments.

Microwave guide tube 19 is jointed to the top of applicator 1. The cross section of the tube 19 is usually in the shape of a rectangle or circle. If a circular tube is used, joining tube 190 is used to connect to applicator 1. Gas outlet tube 3 and the seed injection tube 7 pass through microwave guide tube 19, and are connected to quartz reactor 2.

Particularly, the upper portion of quartz reactor 2 is directly connected to gas outlet tube 3, and the lower part has a gas seal that prevents reacting gas from leaking into applicator 1. That is, O-ring graphite gas 300 is inserted between flange 100 at the lower portion of applicator 1 and the flange 200 of quartz reactor 2, and another graphite gasket 400 is inserted between flange 200 and gas distribution plate 12 to keep completely gas-tight.

The above embodiment requires only one microwave heating apparatus 18 so as to obtain the merits of saving installation, maintenance, and energy costs.

According to the above embodiment of the invention, a high-purity silicon reactor can be used instead of quartz reactor 2. However, in this case, quartz material or any other material through which microwaves can penetrate must be used at the upper side 30 of the reactor.

Processes for the preparation of high-purity polycrystalline silicon according to the present invention are exemplified below.

EXAMPLE 1

A quarts reactor of 48 mm ID, 2.5 mm thick and 1000 mm height is installed inside the applicator of FIG. 1. Microwave as a heating source is introduced through the quaartz reactor wall into the fluidized bed containing silicon particles of 60/100 mesh and the temperature of the fluidized bed is kept at above 700° C. by polarized vibrating friction of silicon molecules.

On the other hand, reacting gas comprising 20 mole % of silane and 80 mole % of hydrogen is supplied to the fluidized bed at the rate of 13.3 l/min at room temperature through a distribution plate cooled by water after being preheated to 300° C. in a preheater. The quartz reactor tube wall is cooled by flowing nitrogen gas into the applicator. Deposited polysilicon granules flow out through the outlet tube by which the height of the fluidized bed is kept at about 150 mm.

Polycrystalline silicon at the average rate of 162.5 g/hr was obtained over a 10 hour operation. Silicon deposition on the quartz reactor wall is not found.

EXAMPLE 2

Example 1 is repeated except that reacting gas comprising 10 mole % of silane and 90 mol % hydrogen is directly supplied to the fluidized bed at the rate of 13.9 l/min at room temperature, not through a preheater. Polycrystalline silicon at an average rate of 82.8 g/hr was obtained for over a 10 hour operation.

EXAMPLE 3

Using the same apparatus as shown in example 1, fluidized bed containing a silicon particle size of 40/60 mesh is kept at 150 mm high, and reacting gas containing a mixture of 22 mole % of silane and 78 mole % of hydrogen is supplied to the fluidized bed at 36.4 l/min and at the room temperature after being preheated at 300° C. through the preheater.

Polycrystalline silicon at the average of 268.1 g/hr was obtained over a 10 hour operation.

EXAMPLE 4

This example was carried out in the same apparatus as used in example 1, and the height of the fluidized bed having a silicon particle size of 40/60 mesh is about 150 mm. Reaction gas containing 10 mole % of silane and 90 mole % of hydrogen is supplied to the fluidized bed at 11.5 l/min without passing through the preheater.

Polycrystalline silicon at an average 63 g/hr was obtained over a 20 hour operation.

EXAMPLE 5

A quartz reactor of 98 mm ID, 3 mm thickness and 1500 mm height is installed in the cylindrical microwave guide tube applicator of FIG. 3 and microwaves as a heating source are supplied from the upper portion of the fluidized bed.

2400 g of silicon having a particle diameter of 60/100 mesh is charged to the quartz reactor through the seed injection tube to be fluidized, and the temperature of the bed is kept at 470° C. Reacting gas comprising 10 mole % of silane and 90 mole % of hydrogen is supplied into the fluidized bed at the rate of 22.8 l/min at room temperature through the preheater. The quartz reactor wall is cooled by nitrogen. Polycrystalline silicon of 151 g was obtained after a 1 hour operation, and no deposition of silicon was found on the inner wall of the quartz reactor.

EXAMPLE 6

A fluidized bed was charged with 3200 g of silicon having a particle diameter of 60/100 mesh, as used in Example 5, and the temperature of the fluidized bed is kept at 700 C. Reacting gas comprising 20 mole % of silane and 80 mole % of hydrogen is supplied into the fluidized bed at the rate of 31.9 l/min at room temperature via the preheater. There is no cooling of the quartz reactor wall by cooling gas. Polycrystalline silicon of 335 g was obtained after a 1 hour operation, and a little silicon deposited onto the wall of quartz reactor was observed.

EXAMPLE 7

3200 g of silicon having a particle diameter of 40/60 mesh is introduced into the same reactor as used in Example 5, and the temperature of the fluidized bed is kept at 700° C. Reacting gas comprising 10 mole% of silane and 90 mole % of hydrogen is supplied into the fluidized bed at the rate of 42.4 l/min at room temperature after being preheated to 350° C. in the preheater. At the same time, the quartz reactor wall is cooled by nitrogen gas. 270 g of polycrystalline silicon was obtained after a 1 hour operation, yet no trace of deposited silicon on the inner wall of the quartz reactor was found.

The scope of the present invention includes not only the arts of the illustrated drawings, examples, and detailed description of the invention, but also all the arts related directly or indirectly to the above arts.

What is claimed is:

1. A method for preparing polycrystalline silicon comprising:
   supplying silicon seed to a single-column fluidized bed reactor to form a bed of silicon seed particles;
   introducing and dispersing a silicon-containing reacting gas into the reactor through a gas distribution means arranged below said bed to fluidize the silicon seed;
   heating the silicon seed above said gas distribution means by introducing microwave energy from at least one side of the reactor into a lower reaction zone of the reactor to deposit silicon from the silicon-containing reacting gas onto the silicon seed to form polycrystalline particles;
   introducing a coolant fluid into said gas distribution means; and
   cooling said gas distribution means with said coolant fluid to maintain said gas distribution means at a temperature to prevent substantial deposition of silicon on said gas distribution means.

2. A method according to claim 1, wherein said reacting gas comprises a carrier gas and a silicon-containing gas selected from the group consisting of silane, dichlorosilane, trichlorosilane and tribromosilane.

3. A method according to claim 1, wherein said silicon seed is selected from the group consisting of silicon particles and polycrystalline silicon particles.

4. A method according to claim 1, further comprising preheating said silicon-containing reacting gas before introduction into the reactor.

5. A method according to claim 4, wherein said reacting gas is preheated to about 300° C.

6. A method according to claim 1, wherein said silicon seed is heated by microwave energy to from about 600° C. to about 1200° C.

7. A method according to claim 1, wherein said microwave energy is 915 or 2450 MHz.

8. A method according to claim 1, wherein said silicon seed and reacting gas are supplied and introduced continuously and simultaneously.

9. A method according to claim 1, wherein said fluidized bed reactor is selected from the group consisting of quartz and silicon reactors.

10. A method according to claim 1, wherein said microwave energy is introduced into the lower reaction zone of said fluidized bed reactor from first and second sides of said fluidized bed reactor, whereby microwave energy introduced from said first side crosses microwave energy introduced from said second side to uniformly heat said silicon seed without said first side microwave energy interfering with said second side microwave energy.

11. A method according to claim 1, further comprising cooling an inner wall of said fluidized bed reactor to prevent deposition of silicon on said inner wall.

12. A method according to claim 11, wherein said inner wall is cooled so as to maintain said inner wall at a temperature below the reaction temperature of said silicon-containing reacting gas.

13. A method according to claim 1, wherein said gas distribution means is cooled to a temperature below about 400° C.

14. A method according to claim 1, wherein said gas distribution means is cooled by a coolant selected from the group consisting of water and nitrogen.

* * * * *